Aug. 16, 1938.   LE ROY W. KELSAY   2,126,891
CABLE TERMINAL
Filed Jan. 31, 1936   3 Sheets-Sheet 1
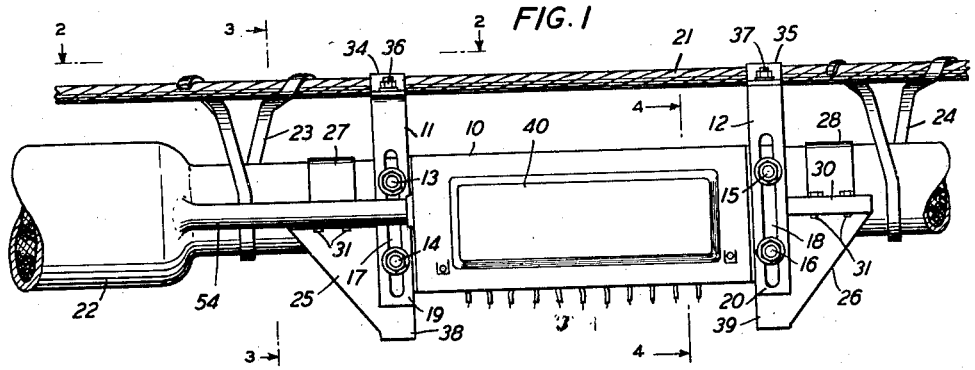
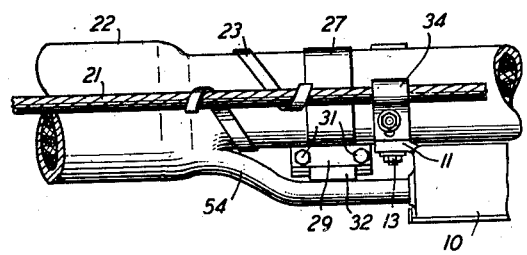
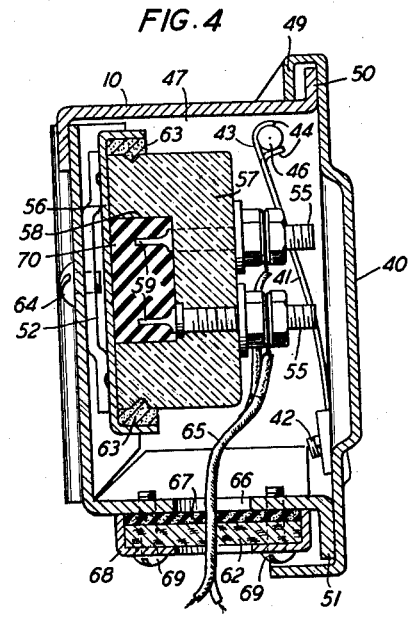
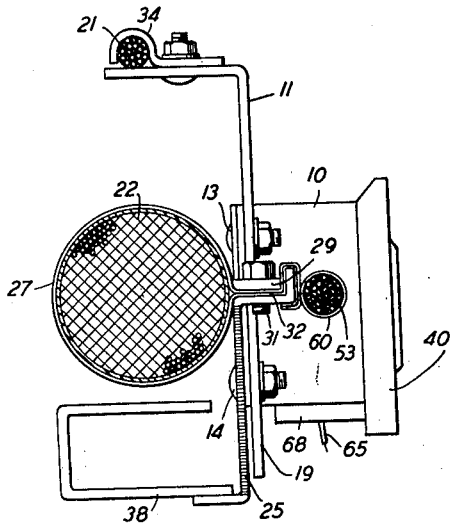
INVENTOR
L. W. KELSAY
BY J. MacDonald
ATTORNEY Aug. 16, 1938.   LE ROY W. KELSAY   2,126,891
CABLE TERMINAL
Filed Jan. 31, 1936   3 Sheets-Sheet 2
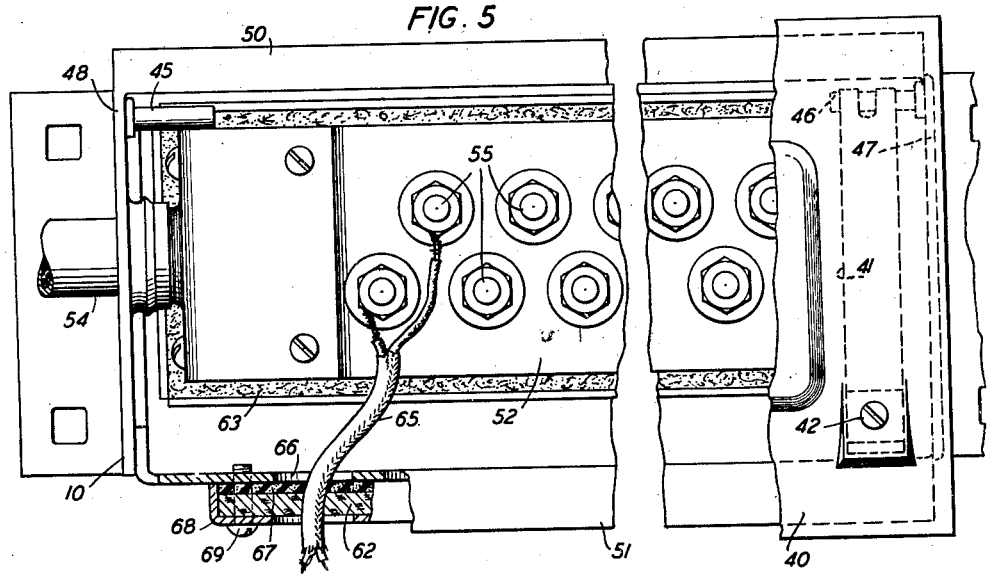
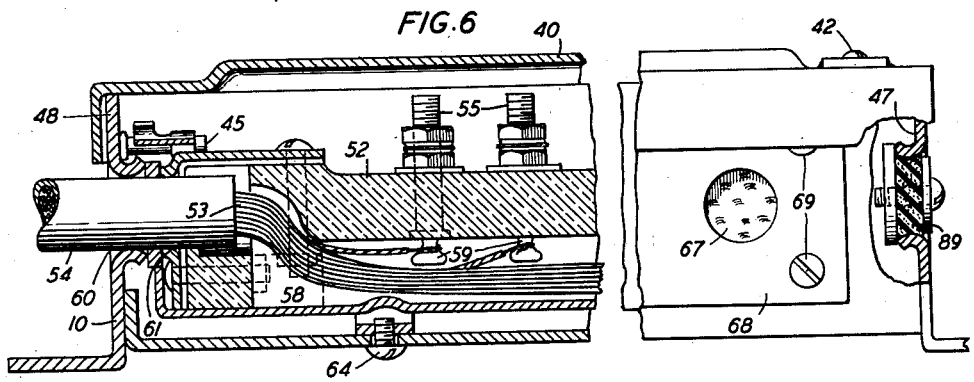
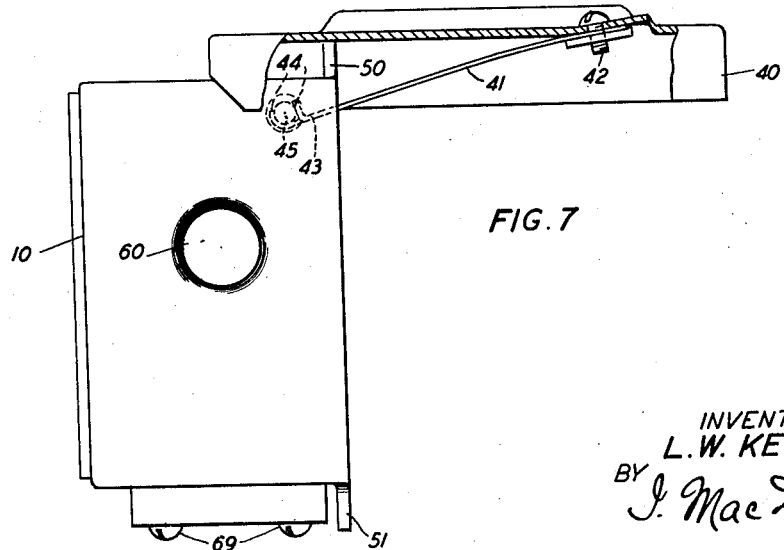
INVENTOR
L. W. KELSAY
BY J. MacDonald
ATTORNEY Aug. 16, 1938.  LE ROY W. KELSAY  2,126,891
CABLE TERMINAL
Filed Jan. 31, 1936  3 Sheets-Sheet 3
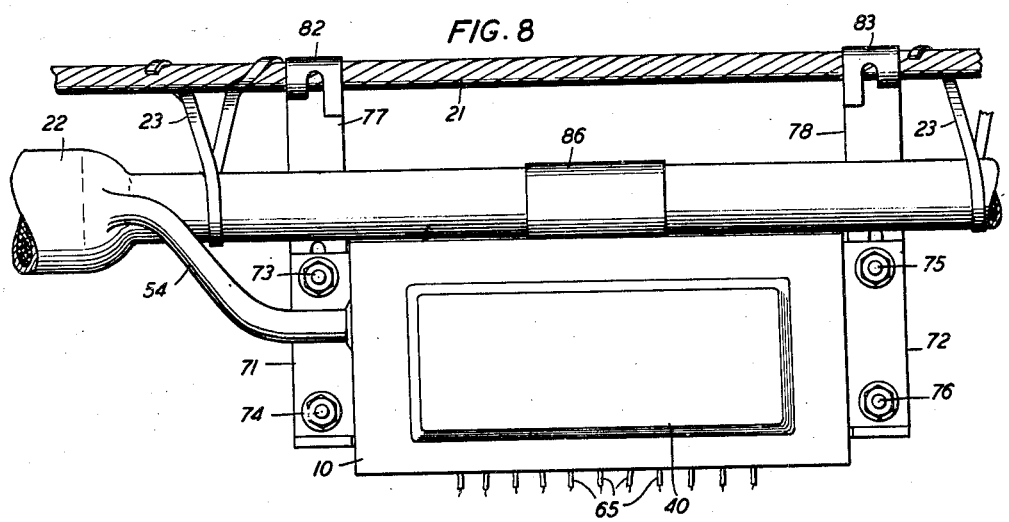
FIG. 8
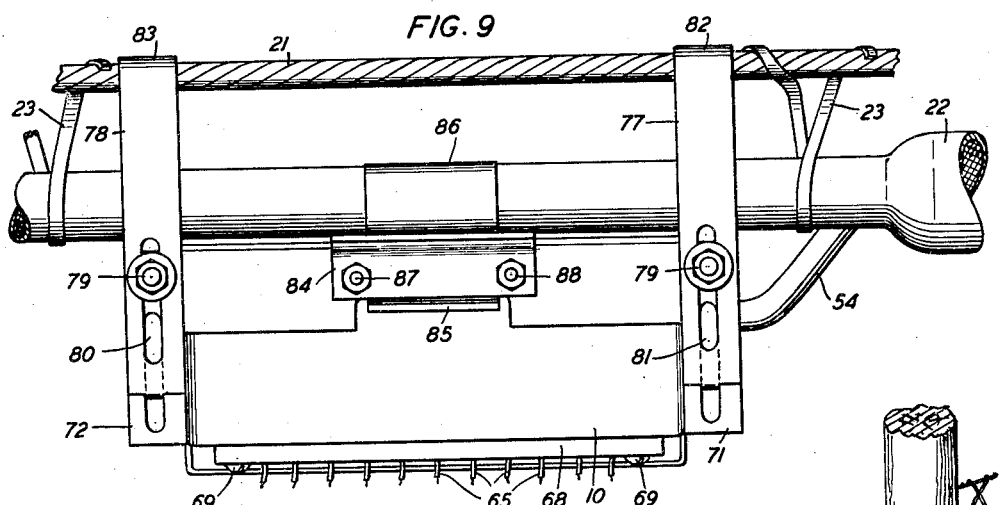
FIG. 9
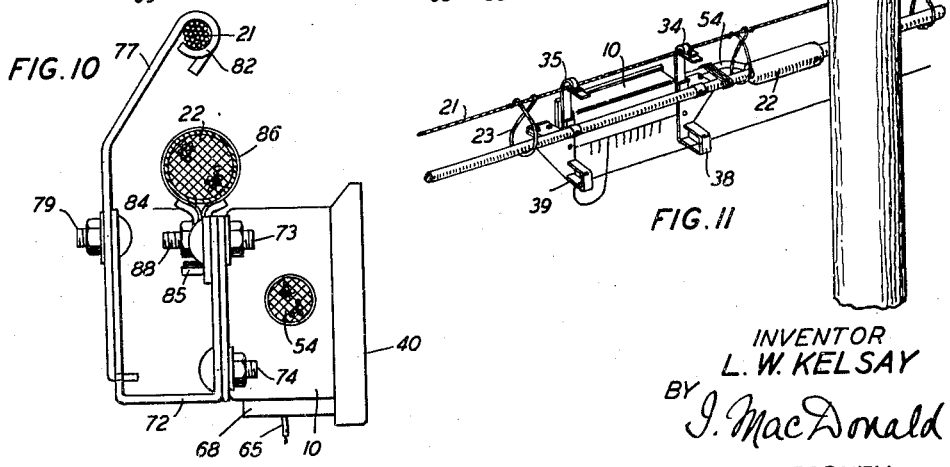
FIG. 10
FIG. 11
INVENTOR
L. W. KELSAY
BY J. MacDonald
ATTORNEY Patented Aug. 16, 1938

2,126,891

UNITED STATES PATENT OFFICE 2,126,891

CABLE TERMINAL

Le Roy W. Kelsay, New York, N. Y., assignor to Bell Telephone Laboratories, Incorporated, New York, N. Y., a corporation of New York Application January 31, 1936, Serial No. 61,685

2 Claims. (Cl. 247—7)

This invention relates to cable terminals and more particularly to a cable terminal mounting of the type shown in Faust Patent No. 1,675,602, July 3, 1928, suspended from the strand cable.

A further object of the present invention is to provide a cable terminal which, while being securely attached on the cable sheath, is slidably mounted on the cable supporting strand or messenger so that the terminal is free to follow any movement in the cable thereby preventing any relative movement between the terminal and the cable.

A still further object of the invention is to provide a cable terminal with adjustable hanger brackets and cable clamping devices integral therewith.

A still further object of this invention is the provision of a sealing chamber on the interior of the terminal housing which may be readily removed in the field for changing the stub entrance from one end of the terminal to the other.

The cable terminal of my invention is mounted directly on the cable sheath and is supported from the same strand or messenger that supports the cable. Connections are made to the wires in the cable and are brought out through a stub connection which is secured to a terminal plate or sealing chamber contained on the interior of the metal housing or casing which comprises the cable terminal. Located on the face of this sealing chamber are a plurality of binding posts which are arranged to accommodate the drop wires or other connections which are brought in from the subscribers' premises and pass through the bottom of the metal housing.

The wires which pass through the bottom of the metal housing are held in place and are made water-proof therearound by passing them through a rubber gasket provided with a plurality of slits.

Applicant's cable terminal is rigidly fastened to the sheath of the aerial cable by means of flexible metal bands which pass around the cable and are secured to the housing by means of a suitable clamping device. Integral with the clamping device which secures the bands around the cable sheath are adjustable brackets which are adapted to hook over the supporting strand or messenger and to be loosely mounted thereon, a construction which prevents movement of the cable from rupturing or fracturing the union between the cable sheath and the cable terminal.

Referring now to the drawings:

Fig. 1 is a side elevation of a supporting strand and cable, the terminal of the invention being in operative position thereon;

Fig. 2 is a fragmentary top plan view of Fig. 1;

Fig. 3 is a view in cross-section taken on line 3—3 of Fig. 1;

Fig. 4 is an enlarged cross-sectional view taken on line 4—4 of Fig. 1;

Fig. 5 is a front elevation, partly in section, of the terminal of this invention with the cover partially broken away;

Fig. 6 is a top plan view, partly in section of the terminal shown in Fig. 5;

Fig. 7 is an end view of the terminal shown in Fig. 5, with the cover in its open position and partly broken away;

Fig. 8 is a side elevation of a supporting strand and cable illustrating a modified method of securing the terminal to the cable sheath and messenger strand;

Fig. 9 is a rear side elevation of the terminal shown in Fig. 8;

Fig. 10 is an end view of the terminal shown in Fig. 8; and

Fig. 11 is a view in perspective illustrating how the terminal is secured to the supporting strand and to the cable with respect to the supporting pole.

Referring now to Fig. 1, applicant's improved cable terminal comprises a sheet metal housing or casing 10, which is secured to a pair of brackets 11 and 12 by means of the bolts 13, 14, 15 and 16 which are adjustably mounted in the slots 17 and 18 of the arms 19 and 20 of the brackets 10 and 11, to provide vertical movement of the terminal housing or casing 10 with respect to the messenger strand 21, which supports the cable 22 by means of the cable rings 23 and 24.

Located on the brackets 11 and 12 and projecting outwardly therefrom in a plane parallel to the axis of the cable 22, are the lugs or bosses 25 and 26 to which the flexible metal straps 27 and 28 are secured by means of clamping plates 29 and 30, (see Figs. 2 and 3) and the bolts 31 which pass through the clamping plates 29 and 30 and grip the ends 32 and of the straps 27 and 28 therebetween.

The upper portions of the brackets 11 and 12 are bent over at right-angles and are provided with the clamping members 34 and 35 which are held in place by means of the bolts 36 and 37. On the bottom of the brackets 11 and 12 are a pair of U-shaped members 38 and 39 which are arranged to support the drop wires as shown in Fig. 11.

The foregoing description describes how the terminal box or casing of applicant's invention is secured to the strand and to the cable sheath by a method which places no strain on the cable or on its stub connection.

Referring now specifically to the construction of the terminal box or casing as shown in the accompanying drawings, the metal housing is provided with a lid or cover 40 which is hingedly secured to the housing 10 by means of the hinges 41, these hinges are constructed from a strong spring material, such as phosphor bronze, and are rigidly secured adjacent the lower edge of the cover 40 by means of the screws 42. The opposite ends 43 of the hinges 41 have upstanding portions 44 which frictionally engage the studs 45 and 46 which are secured to the ends 47 and 48 of the housing 10.

The upper edge of the cover 40 is provided with a return bend flange portion 49 which engages the cooperating lip 50 on the upper edge of the housing 10. The lower edge of the casing or housing 10 is provided with a bent-over portion 51, this bent-over portion cooperating with the lower edge of the cover 40 and with the upper bent-over flange, thereby preventing the entrance of water since the cover 40 is held in close contact with the metal housing 10 by means of the spring hinges 41.

On the interior of the housing 10 is located a binding post or sealing chamber 52, see Figs. 4, 5 and 6. The binding post chamber is adapted to receive the conductors 53 which are brought out from the main cable 22 by means of the stub connection 54 and connected to the rear of the binding posts 55 by means of solder or any other suitable method.

In the sealing chamber 52 above referred to, a metal casing 56 is provided with a binding post panel 57 of insulating material, which is provided on its rear side with a recessed portion 58 into which the rear ends 59 of the binding posts 55 extend, conductors 53 from the cable stub 54 are positioned in this recess and are soldered to their respective binding posts.

The cable stub 54 enters the housing 10 through the aperture 60 and passes into the sealing chamber 52 where it terminates and is secured by means of the water-tight fitting 61. After the cable stub 54 has been secured in the sealing chamber 52 and housing 10 by means of the fitting 61, and the conductors 53 have been soldered to the rear ends 59 of the binding posts 55, the recess is filled with a suitable insulating compound 70.

As shown in Figs. 4, 5 and 6, the binding post panel 57 is secured to the metal casing 56 by means of the molten material 63 (see Fig. 4). The sealing chamber 51 is secured to the housing 10 by means of the stud 64.

Referring to Figs. 4 and 5, the drop or subsidiary wires 65 which are adapted to be connected to the subscribers' stations are brought out through the bottom of the housing 10 through the apertures 66. In order to prevent the entrance of moisture at this point, a gasket 67, of resilient material, such as rubber, is positioned between the bottom of the housing 10 and a cork gasket 62. A tray-shaped cover 68, holds the gaskets 62 and 67 in close contact with the bottom of the housing 10 by means of the screws 69, and a water-tight joint is provided where the conductors 65 pass therethrough.

Each end of the housing 10 is provided with an aperture for bringing in the cable stub 54, the unused aperture being closed by means of a fitting such as the one shown at 89.

In Figs. 8, 9 and 10 applicant has illustrated a modified type of mounting for his cable terminal. The terminal 10 and its associated parts, except the mounting brackets, are substantially the same as the terminal shown in Figs. 1 to 7, inclusive, which has been described in detail with respect to one form of mounting as shown and heretofore described.

It has been found advisable in some instances to mount the terminal in such a manner that its position with respect to the cable is slightly below instead of in front of the cable. To meet this condition, the modified type of mounting as shown in Figs. 8, 9 and 10 has been provided.

By referring to Fig. 10 it is readily apparent that the position of the terminal box, with respect to the cable is quite different from that shown in Fig. 3.

In the modified form of applicant's mounting, the terminal housing 10 is secured to a pair of U-shaped brackets 71 and 72 by means of bolts 73, 74, 75 and 76. These brackets in turn are secured to the upwardly extending arms 77 and 78 by means of the bolts 79 which are adjustably mounted in the slots 80 and 81 of the arms 77 and 78, thereby permitting the adjustment of the terminal with respect to the messenger strand 21 and the cable 22. On the upper ends of the arms 77 and 78, hooks 82 and 83 are provided for supporting the terminal on the messenger strand 21. These hooks may be bent over to prevent displacement.

On the rear of the housing 10 is a clamping member 84, which securely grips the ends 85 of the metal strap 86, which surrounds the cable 22, by means of the bolts 87 and 88. These bolts when tightened down draw the metal strap tightly around the cable 22 and secure it firmly to the housing 10.

Various changes and modifications may be made within the scope of my claims without departing from the spirit of the invention.

What is claimed is:

1. A cable terminal housing, characterized in this, that the cover for said housing is hinged thereto by a pair of flat springs having forked ends, one end of each spring being rigidly secured to the inside of the cover and the forked end frictionally engaging a stud on the inner wall of the housing, said springs being so mounted and tensioned that when the cover is raised beyond a certain point said springs snap the cover open and when lowered beyond said point they snap it closed.

2. A cable terminal housing, characterized in this, that the cover for said housing is hinged thereto by a pair of flat springs having forked ends, one end of each spring being rigidly secured to the inside of the cover and the forked end frictionally engaging a stud on the inner wall of the housing, said springs being so mounted and tensioned that when the cover is raised beyond a certain point said springs snap the cover open and when lowered beyond said point they snap it closed, and a bent over portion on the upper edge of said cover engaging a lip on said housing to prevent the entrance of moisture.

LE ROY W. KELSAY.